United States Patent Office 2,964,448
Patented Dec. 13, 1960

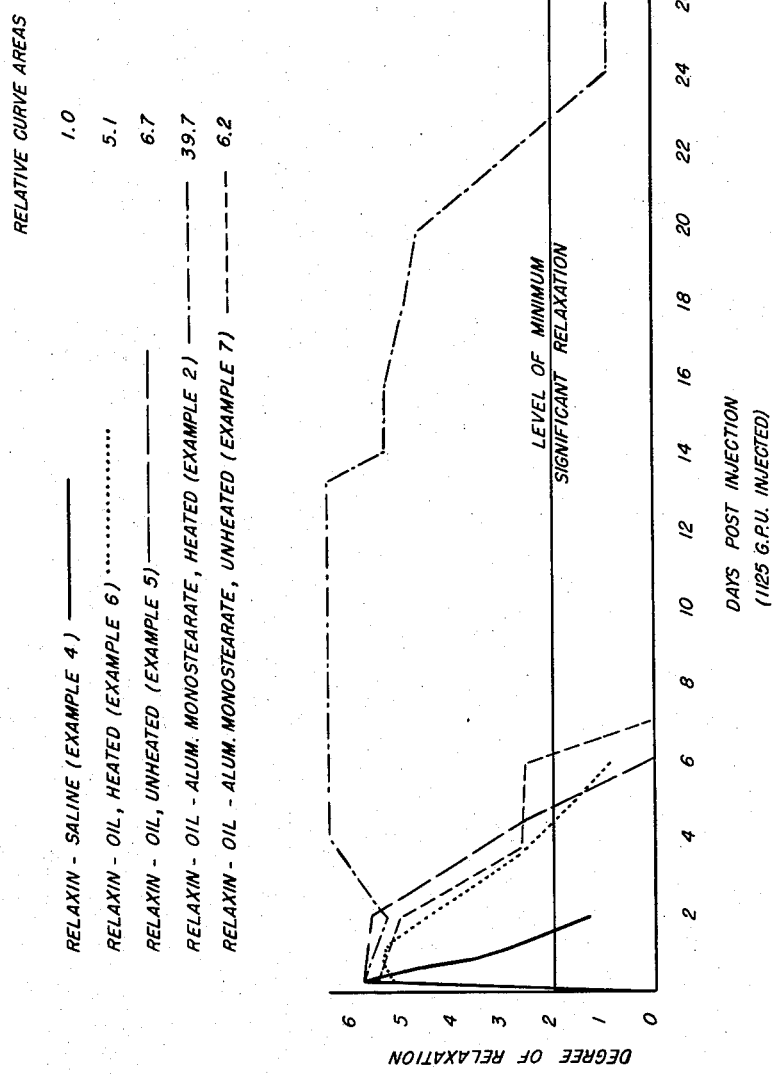

2,964,448

RELAXIN COMPOSITION AND PROCESS FOR PREPARING SAME

Joachim Anschel, 13 Clover Lane, Livingston, N.J.

Filed Jan. 27, 1959, Ser. No. 789,363

10 Claims. (Cl. 167—74)

This invention relates to a new and novel injectable relaxin composition having a prolonged activity in mammals and to a method of producing said relaxin composition.

Relaxin is present in the ovaries of pregnant hogs and may be extracted therefrom. It is believed to be a hormone of pregnancy and has aroused great interest in the field of medical research. For instance, it has been known to cause uterine cervical relaxation in cows; to increase the dilatability of the uterine cervix in ovariectomized estrogen-primed hogs; to cause definite milk let-down in sheep and to a lesser extent in cows, and to cause marked lobulo-alveolar growth of the mammary gland of a rat. In the clinic, it has been found to cause dilation of the uterine cervix in near-term pregnant women who fail to dilate after injections of pitocin and to halt premature labor in certain female patients thus allowing them to go to term.

Due to the very small concentration of the active hormone present in ovaries, a complex extraction and purification process is required to obtain a relaxin fraction having high biological potency. Because of the complexity of the extraction and purification process, the relaxin preparations now available are extremely costly. The biological activity of relaxin when injected or otherwise administered to mammals is of relatively brief duration with the result that frequent doses are normally required, which involves very substantial expense to those patients who require relaxin.

It is an object of this invention to provide a relaxin composition suitable for injection and having a prolonged or repository effect.

Other objects and the advantages of this invention will appear hereinafter from the following detailed description.

It has now been found that by heating a composition comprising a mixture of relaxin, an injectable oil, and a fatty acid salt of aluminum the product obtained exhibits an extraordinarily prolonged relaxin activity in mammals, compared to the activity of relaxin alone, or to the mixture of relaxin, injectable oil and aluminum fatty acid salt which has not been subjected to the heat treatment step.

The relaxin used in preparing the improved compositions of the present invention can be extracted from ovaries by any of the extraction techniques known in the art, for example; that disclosed in U.S. Patent 2,-852,431. Compositions in accordance with this invention can be prepared from relaxin obtained from ovarian tissue extracts or from relaxin which has been chemically complexed with other materials, such as the relaxin-estrogen complex disclosed in copending application Serial Number 729,515, filed April 21, 1958, the relaxin-zinc complex disclosed in copending application Serial Number 687,612, filed October 2, 1957, and the relaxin-tannic acid complex disclosed in copending application Serial Number 681,161, filed on August 30, 1957. The term relaxin as used in the specification and claims embraces both relaxin obtained from ovarian tissue extracts and also relaxin which has been chemically complexed as described above. The relaxin compositions of this invention may contain any amount of relaxin, normally measured in relaxin units, depending upon the potency desired.

The biological activity of relaxin is customarily expressed in Guinea pig units, or G.P.U., as G.P.U./ml. in the case of a solution or G.P.U./mg. in the case of a powdered preparation. The measurement of activity expressed as G.P.U. is determined by manual palpation of the pelvis. An electrometric method for assay is described by Catchpole et al. (Endocrinology 8, 377 (1952); Biochem. Biophys. Acta. 8, 575, footnote p. 576 (1952)). Other in vivo assays are described by R. L. Kroc, V. L. Beach, N. R. Stasilli, Fed. Proc. Abs. 367, pp. 113–114 (1956); R. L. Kroc, B. G. Steinetz, V. L. Beach, N. R. Stasilli, Program of the Endocrine Society Abst. 123, pp. 77–78 (1956). An in vivo method is described by Sawyer et al. (Am. J. Physiology, 172, 547, (1953)). Injectable relaxin compositions conventionally contain about 1000 to about 5000 G.P.U./ml.

The injectable relaxin compositions of the present invention comprise an injectable oil which functions both as a diluent and as the injection vehicle. Any of the oils commonly used in the preparation of injectable therapeutic compositions can be used in the present invention. The oil should be of low acidity and be free from rancidity. Suitable oils include the vegetable oils such as peanut oil, corn oil, cotton seed oil, sesame oil and the like. Sesame oil is the preferred injectable oil in the preparation of my novel compositions.

The relaxin compositions of this invention contain a fatty acid salt of aluminum in addition to the oil and aluminum salts of fatty acids having from 7 to 25 carbon atoms are generally preferred. Aluminum salts of stearic acid and particularly aluminum monostearate have been found to be particularly effective. The amount of the fatty acid salt of aluminum in my novel compositions may be varied with a range of about 1 to about 5 percent by weight of the oil being preferred.

It is an essential step in the preparation of the relaxin compositions of this invention, that a mixture of relaxin, a fatty acid salt of aluminum and an injectable oil be heated at a temperature between about 100° C. and about 125° C. for between about one hour and about ten minutes.

It has been found that the heat treatment at a temperature between 115° C. and 121° C. for 15 to 30 minutes is particularly effective. These preferred temperatures correspond to the temperature in a pressure autoclave maintained at steam pressures of 10 and 15 pounds per square inch gauge, respectively. The heat treatment is most conveniently carried out after the mixture of relaxin, the aluminum fatty acid salt and the injectable oil has been incorporated into standard hypodermic vials.

The heat treatment of this mixture of relaxin, a fatty acid salt of aluminum and an injectable oil, as described above, imparts to the relaxin mixture an extraordinarily prolonged repository activity when injected. To obtain this prolonged, repository effect both the presence of a fatty acid aluminum salt in the composition and the heat treatment step are necessary. If either or both of these two essential elements are omitted, the relaxin composition obtained, while useful, does not exhibit the desired repository action when injected.

Heating the mixture of relaxin, the fatty acid aluminum salt and the injectable oil does not result in any diminution of the biological potency of the relaxin. This in itself is quite suprising since it has been observed that aqueous solutions of relaxin or aqueous suspensions of relaxin in a gelatin solution undergo a loss in biological potency when heated.

The mixture of relaxin, fatty acid aluminum salt and injectable oil, subjected to heat treatment in accordance with this invention, can be prepared in a number of ways. For example, relaxin powder may be intimately mixed with the fatty acid salt of aluminum, the resulting mixture suspended into an injectable oil, and this mixture then subjected to the heat treatment step described. The intimate mixing of relaxin and the fatty acid aluminum salt may be carried out conveniently by dissolving the aluminum salt in a volatile organic solvent such as ethyl alcohol, acetone, benzene and the like, and thoroughly mixing the resulting solution with relaxin powder. After evaporation of the volatile organic solvent, preferably at lower temperatures and under vacuum, a dry powder results consisting of relaxin which is uniformly coated with the fatty acid aluminum salt.

Alternately, a fatty acid salt of aluminum may be suspended in an injectable oil and the relaxin added to the resulting suspension. It has been found particularly desirable in the preparation of the relaxin compositions of this invention, in order to produce compositions of the highest degree of sustained activity, that where the initial step comprises the suspension of a fatty acid salt of aluminum in an injectable oil that the suspension be heated sufficiently to gel the oil prior to the incorporation of the relaxin therein. Fatty acid salts of aluminum will cause gelation of an oil when an oil suspension of the aluminum salt is subjected to controlled heat treatment. The temperature and time relations for gelation are a function of the particular fatty acid salt of aluminum used. The method of gelling an oil by heating the oil in the presence of a fatty acid salt of aluminum is well known in the art, and the specific temperature and time requirements to effect gelation form no part of the present invention, being merely conventional. For example, a vegetable oil can be gelled by heating a suspension of aluminum monostearate in the oil to a temperature of 90° C. followed by continued heating at a rate of 1 to 2° C. per minute to a temperature of 115° C. to 120° C. This temperature is maintained for about 15 minutes with constant stirring and then the oil is cooled. An important element of this invention is the discovery that a relaxin composition prepared by suspending relaxin in a gelled mixture of an oil and a fatty acid salt of aluminum and which is thereafter heated yields a suspension having an even more highly sustained relaxing activity than a composition prepared by subjecting a suspension of relaxin in an ungelled mixture of a fatty acid salt of aluminum and an oil to heat treatment, as described above.

Although this particular technique results in a relaxin composition having the highest degree of sustained action after injection, the compositions produced tend to have a somewhat higher viscosity than compositions prepared when the oil is not gelled. Accordingly, where the very highest degree of sustained relaxin activity is not required, compositions prepared by heating an ungelded mixture of relaxin, a fatty acid salt of aluminum and an oil in accordance with this invention are generally preferred, since these compositions have a lower viscosity and are generally easier to inject.

It is desirable that compositions prepared in accordance with this invention contain a preservative such as benzyl alcohol, chlorobutanol, cresol, thimerosol, phenol, benzethonium chloride, amylmetacresol and the like.

The preservative may be most conveniently introduced into the composition by preparing a solution in a volatile solvent such as alcohol and by mixing this solution with relaxin powder. The solvent is then evaporated leaving a powdered relaxin, the particles of which are coated with preservative. This procedure is desirable since it insures sterilization of the relaxin.

The amount of preservative may be varied over wide limits, depending upon the particular preservative used, normally within a range of 0.005 to 0.1 percent of the composition.

The following examples illustrate the preparation of relaxin compositions in accordance with the present invention.

EXAMPLE I

A quantity of 20 grams of aluminum monostearate (Special M from Mallinckrodt Chemical Company, St. Louis, Missouri), is suspended in 1000 ml. of U.S.P. sesame oil and the suspension is heated to 90° C. with stirring. Heating is continued at the rate of 2° C. per minute, to a temperature of 120° C. This temperature is maintained with constant stirring for 15 minutes, and the solution is cooled to room temperature. A quantity of 0.06 ml. of amylmetacresol is added to the cooled gelled sesame oil which is then blended with 20 grams of relaxin powder, having an assay of 150 G.P.U./mg. Standard hypodermic vials are filled with the resulting mixture and silicone stoppers and triple aluminum seals are applied to each vial. The vials are then placed in a pressure autoclave with the steam pressure of 10 pounds per square inch gauge, corresponding to a temperature of 115° C., for 30 minutes. The resulting relaxin composition has an activity of 3000 G.P.U./ml.

EXAMPLE II

A quantity of 0.06 ml. of amylmetacresol is dissolved in 100 ml. ethyl alcohol and the solution is mixed with 20 grams of relaxin, having an assay of 150 G.P.U./mg. The mixture is allowed to stand overnight and the alcohol is then removed under vacuum. A quantity of 20 grams of aluminum monostearate (Special M) is suspended in 1000 ml. U.S.P. sesame oil and the mixture is heated to 90° C. with stirring. Heating is continued at a rate of 1° C. per minute to 115° C., and this temperature is maintained for 15 minutes.

The gelled oil is then allowed to cool to room temperature and the dry mixture of relaxin and amylmetacresol is then suspended therein. Standard hypodermic vials are filled with the mixture and sterilized stoppers and triple aluminum seals are applied to each vial. The vials are placed in an autoclave with a steam pressure of 10 pounds per square inch gauge (115° C.) for 30 minutes. The resulting relaxin composition has an activity of 3000 G.P.U./ml.

EXAMPLE III

A quantity of 0.06 ml. amylmetacresol and 20 grams aluminum monostearate (Special M) is dissolved in 100 ml. C.P. benzene and 20 grams of relaxin with an assay of 150 G.P.U./mg. is added. The mixture is allowed to stand overnight and the benzene is then removed under vacuum. The dry powder is incorporated into 1000 ml. sesame oil and hypodermic vials are filled with the mixture. After the application of silicone stoppers and triple aluminum seals to each vial, they are placed in an autoclave at a steam pressure of 15 pounds per inch gauge (121° C.) for 30 minutes. The resulting relaxin composition has an activity of 3000 G.P.U./ml.

Examples I and II illustrate the preparation of relaxin compositions wherein relaxin is suspended in a gelled mixture of oil and a fatty acid salt of aluminum. Example III illustrates the preparation of a relaxin composition and a fatty acid salt of aluminum where relaxin is suspended in an ungelled oil. Physically, the composition prepared in accordance with Example III is more fluid and has a lower viscosity than compositions prepared in accordance with Examples I and II.

In order to evaluate the prolonged biological activity of relaxin compositions prepared in accordance with this invention, other relaxin compositions were prepared to serve as controls.

EXAMPLE IV

Relaxin is dissolved in physiological saline to yield a solution having a potency of 3000 G.P.U./ml.

EXAMPLE V

Relaxin is suspended in sesame oil to yield a suspension having a potency of 3000 G.P.U./ml.

EXAMPLE VI

The solution prepared as described in Example V, is subjected to a heat treatment in a pressure autoclave, with a steam pressure of 10 pounds per square inch gauge (115° C.) for 30 minutes. This heat treatment is the same as that used in the preparation of the relaxin composition described in Example II.

EXAMPLE VII

A relaxin preparation comprising a mixture of relaxin, aluminum monostearate and sesame oil is prepared in accordance with the procedure described in Example II, with the exception that the final heat treatment in the pressure autoclave is omitted.

In order to evaluate the duration of activity of the relaxin preparation of Example II in comparison with the activity of the control relaxin compositions prepared in accordance with Examples IV, V, VI and VII, 0.375 ml. of the compositions of Examples II, IV, V, VI and VII (1125 G.P.U.) was injected intramuscularly into estrogen-primed guinea pigs. After injection the guinea pigs were examined periodically to determine the degree of relaxation of pubic symphysial ligaments.

The results are presented in the following table and are illustrated graphically in the drawing which is a plot of degree of relaxation of symphysis pubis in arbitrary units as a function of days after injection for the compositions of Example II prepared in accordance with this invention and Examples IV, V, VI and VII shown for comparative purposes. In the table, the entry "Days of Significant Relaxation" represents the number of days after injection before the effect produced fell below the line shown in the drawing as "Level of Minimum Significant Relaxation."

The tabular entry "Relative Relaxation" represents a graphical integration of the area of the curve for each composition above the reference line of "Level of Minimum Significant Relaxation." A value of 1 is assigned to the area of the curve for the relaxin composition in saline, Example IV, the solid line in the drawing.

Table I

| | Ex. II | Ex. IV | Ex. V | Ex. VI | Ex. VII |
|---|---|---|---|---|---|
| Vehicle | Oil | Saline | Oil | Oil | Oil. |
| Alum. Monostearate—percent by weight | 2 | | | | 2. |
| Heat Treatment | Yes | No | No | Yes | No. |
| Days of Sign. Relaxation | 23 | 1.5 | 5.0 | 4.5 | 6.0. |
| Relative Relaxation | 39.7 | 1.0 | 6.7 | 5.1 | 6.2. |

The remarkable and unexpected effectiveness of relaxin compositions prepared in accordance with the present invention are clearly shown by the data in the above table and in the drawing.

The composition of Example II resulted in a significant relaxation in the guinea pigs for 23 days, compared to a value of only 6 days in the case of the composition of Example VII. This comparison indicates the unexpected advantage obtained by heat treatment of a composition comprising relaxin, aluminum monostearate, and oil. A comparison between the results shown for the compositions of Examples V and VI clearly demonstrate the necessity of having the aluminum salt present in the composition, since heat treatment of a composition comprising relaxin and oil without the presence of aluminum salt actually resulted in a slight decrease in the duration of relaxin activity.

The results also indicate that a level of a high degree of relaxation is maintained for prolonged periods with compositions prepared in accordance with this invention. For example, the composition of Example II showed a duration of relaxation of 23 days compared to 2 days for the relaxin in saline control, but the overall quantum of relaxation was 39.7 times greater than that of the saline control.

Injection of the composition of Example III in estrogen-primed guinea pigs showed a similar prolonged relaxin activity. In a test on five guinea pigs, each having been administered 1500 G.P.U relaxin as the composition of Example III, two out of the five guinea pigs were well relaxed fourteen days after the injection.

The results of the tests indicate that relaxin compositions comprising a mixture of relaxin, an aluminum salt of a long chain fatty acid and an oil which had been subjected to a heat treatment step, as described above, have the remarkable and unexpected property of sustained activity in mammals. This is a highly desirable discovery since compositions prepared in accordance with this invention need be administered far less frequently than compositions heretofore available with the resulting great saving in cost to patients undergoing relaxin therapy.

The mechanism by which the remarkable effect of relaxin compositions of this invention is achieved is not known nor is any theory proposed.

It is understood that the foregoing detailed description is given merely by way of illustration and that many variations may be made therein without departing from the spirit of this invention.

Having described my invention, what I desire to secure by Letters Patent is:

1. A method of preparing a relaxin composition having a prolonged activity in mammals which comprises heating a mixture of relaxin, an injectable oil and an aluminum salt of a fatty acid having from 7 to 25 carbon atoms to a temperature of about 100° C. to about 125° C. for between 1 hour and about 10 minutes.

2. A method of preparing a relaxin composition having a prolonged activity in mammals which comprises heating a mixture of relaxin, an injectable oil and about 1 to about 5 percent by weight of the oil of an aluminum salt of a fatty acid having from 7 to 25 carbon atoms to a temperature of about 115° C. to about 121° C. for about 15 minutes to about 30 minutes.

3. A method according to claim 2 wherein said aluminum salt is an aluminum salt of stearic acid.

4. A method according to claim 3 wherein said aluminum salt is aluminum monostearate.

5. A method of preparing a relaxin composition having prolonged activity in mammals which comprises heating an injectable oil with about 1 to about 5 percent of its weight of an aluminum salt of a fatty acid having from 7 to 25 carbon atoms to a temperature and for a time sufficient to gel said oil, incorporating relaxin into said gelled oil and heating the mixture of relaxin and said gelled oil to a temperature of about 100° C. to about 125° C. for between about 1 hour and about 10 minutes.

6. A method of preparing a relaxin composition having prolonged activity in mammals which comprises heating an injectable oil with about 1 to about 5 percent of its weight of aluminium monostearate to a temperature and for a time sufficient to gel said oil, mixing relaxin with a solution of a preservative in a volatile organic solvent, heating said mixture to evaporate said solvent to yield a dry powder the particles of which are coated with said preservative, incorporating said powder into said gelled oil and heating the resulting mixture to a temperature of about 115° C. to about 121° C. for about 15 to about 30 minutes.

7. A method of preparing a relaxin composition having prolonged activity in mammals which comprises mixing relaxin with a solution of a preservative and aluminum monostearate in a volatile organic solvent, heating said mixture to evaporate the solvent to yield a dry powder the particles of which are uniformly coated with the preservative and aluminum monostearate, suspending said powder into an injectable oil, the quantity of said aluminum monostearate being about 1 to about 5 percent by weight of the oil, and heating said suspension to a temperature of about 115° C. to about 121° C. for about 15 to about 30 minutes.

8. An injectable relaxin composition having a prolonged activity in mammals prepared by the method of claim 1.

9. An injectable relaxin composition having a prolonged activity in mammals prepared by the method of claim 6.

10. An injectable relaxin composition having a prolonged activity in mammals prepared by the method of claim 7.

References Cited in the file of this patent

UNITED STATES PATENTS

| 2,733,184 | Ziegler | Jan. 31, 1956 |
| 2,768,112 | Buckwalter | Oct. 23, 1956 |

OTHER REFERENCES

Eichner: J.A.M.A., vol. 161, No. 12, July 21, 1956, p. 1197.